US012633772B2

(12) United States Patent (10) Patent No.: US 12,633,772 B2
Chen et al. (45) Date of Patent: May 19, 2026

(54) POWER SYSTEM AND POWER SYSTEM CONTROL METHOD

(71) Applicant: Huawei Digital Power Technologies Co., Ltd., Shenzhen (CN)

(72) Inventors: Wenbin Chen, Shenzhen (CN); Qing Bian, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 204 days.

(21) Appl. No.: 18/527,619

(22) Filed: Dec. 4, 2023

(65) Prior Publication Data

US 2024/0113556 A1 Apr. 4, 2024

Related U.S. Application Data

(63) Continuation of application No. PCT/CN2021/098290, filed on Jun. 4, 2021.

(51) Int. Cl.
*H02J 13/12* (2026.01)
*H02J 4/25* (2026.01)
*H02J 13/13* (2026.01)
(52) U.S. Cl.
CPC ................ *H02J 13/12* (2026.01); *H02J 4/25* (2026.01); *H02J 13/1311* (2026.01)
(58) Field of Classification Search
CPC .... H02J 13/12; H02J 13/1313; H02J 13/1315; H02J 13/1321; H02J 13/1311; H02J 4/25; H02J 4/20; H02J 4/10
See application file for complete search history.

(56) References Cited

U.S. PATENT DOCUMENTS 9,768,680 B2 9/2017 Bojarski et al.
2012/0013283 A1* 1/2012 Tallam ................ H02M 5/4585
318/400.26

(Continued)

FOREIGN PATENT DOCUMENTS

CN 104300770 A 1/2015

OTHER PUBLICATIONS

Ashourloo et al., "Decentralized Quasi-Fixed-Frequency Control of Multiphase Interleaved Hybrid Dickson Converters for Fault-Tolerant Automotive Applications", IEEE Transactions on Power Electronics, IEEE, XP011779112, Dec. 9, 2019, vol. 35, No. 7, pp. 7653-7663.

(Continued)

*Primary Examiner* — Nguyen Tran
(74) *Attorney, Agent, or Firm* — Maier & Maier, PLLC

(57) ABSTRACT

A power system includes N power modules and at least two adjustment units that are one-to-one coupled to the N power modules. Each adjustment unit is connected to a controller, and each power module is configured to perform power conversion. The adjustment unit is configured to: obtain a current working status of the corresponding power module, generate a status signal and a phase frequency signal, and send the status signal and the phase frequency signal to the controller. The controller generates an output power signal based on the status signal and the phase frequency signal. The adjustment unit is further configured to: obtain the output power signal, and adjust an output power of the corresponding power module based on the output power signal, where N is a positive integer greater than or equal to 2.

19 Claims, 6 Drawing Sheets

System 400

(56) References Cited

U.S. PATENT DOCUMENTS

| 2014/0021795 A1* | 1/2014 | Robertson | H02J 50/80 |
| | | | 307/104 |
| 2016/0094030 A1 | 3/2016 | Gao et al. | |
| 2024/0128764 A1* | 4/2024 | Mitsugi | H02J 3/38 |

OTHER PUBLICATIONS

Pazouki et al., "Fault Tolerant Control Method for Interleaved DC-DC Converters under Open and Short Circuit Switch Faults", IEEE, Oct. 1, 2017, pp. 1137-1142.

* cited by examiner

System 200

System 300

System 400

Method 500

POWER SYSTEM AND POWER SYSTEM CONTROL METHOD

CROSS-REFERENCE TO RELATED APPLICATIONS

This application is a continuation of International Application No. PCT/CN2021/098290, filed on Jun. 4, 2021, the disclosure of which is hereby incorporated by reference in its entirety.

TECHNICAL FIELD

The embodiments relate to the energy field, to a power system, and to a power system control method.

BACKGROUND

With development of technologies such as 5G and cloud computing, a market has increasingly high requirements on efficiency and power density of power systems such as site power and a data center. In these systems, a plurality of switching power modules usually work in parallel to improve a power supply capability of the power system.

Currently, there is a lot of research and exploration in the industry on an ultra-high-efficiency power supply (efficiency ≥98%) system, and efficiency is usually improved by reducing losses of a power device and a magnetic device. Therefore, a power device and a magnetic device of high costs are usually required, and system costs are increasingly high.

Therefore, a power system control method is urgently required to improve efficiency and power density of a power system without increasing costs of the power system.

SUMMARY

The embodiments provide a power system and a power system control method to improve efficiency and power density of the power system at the same costs.

According to a first aspect, a power system is provided, including: N power modules, where the N power modules include a power conversion circuit, and the N power modules are configured to: receive an alternating current voltage or a direct current voltage, and output the alternating current voltage or the direct current voltage to a target load through the power conversion circuit; N adjustment units, where the N adjustment units are one-to-one coupled to the N power modules, and each adjustment unit is configured to generate a status signal and a phase frequency signal based on a working status of the corresponding power module; and a controller, where the controller is coupled to the N adjustment units, and the controller is configured to: obtain the status signal and the phase frequency signal of each adjustment unit, and generate an output power signal based on the status signal and the phase frequency signal. The adjustment unit is further configured to: obtain the output power signal, and adjust an output power of the corresponding power module based on the output power signal. N is a positive integer greater than or equal to 2.

According to the power system provided, the corresponding adjustment units of the plurality of power modules may generate the status signals and the phase frequency signals based on the working statuses, and send a current status signal and a current phase frequency signal of a power module to the controller. The controller may generate an output power signal based on the current status signal and the current phase frequency signal of the power module, so that the adjustment unit adjusts an output power of the corresponding power module. In this way, a ripple value of the output power is reduced, a system loss is reduced, and system efficiency and power density can be improved at the same costs.

With reference to the first aspect, in some implementations of the first aspect, the system further includes: the controller is configured to: determine a ripple phase difference of the power module currently in a working mode based on the status signal; and generate the output power signal based on the ripple phase difference and the phase frequency signal of the adjustment unit.

The solution provides a method for determining the output power signal based on the ripple phase difference of the power module in the working mode. According to the method, a ripple value of an output power signal of the power system can be reduced, thereby improving system efficiency.

With reference to the first aspect, in some implementations of the first aspect, the system further includes: the controller is configured to: determine a quantity of power modules currently in the working mode based on the status signal; and determine the ripple phase difference based on the quantity of power modules currently in the working mode.

The solution provides a method for determining the ripple phase difference based on the quantity of power modules currently in the working mode. According to the method, a ripple value of a real-time output power signal of the power system can be reduced, and this helps improve system efficiency.

In a possible implementation, a ripple value of the output power signal is less than a ripple value of the phase frequency signal of each adjustment unit.

In the solution, the ripple value includes a ripple current and a ripple voltage, and a ripple value of the output power signal determined based on the ripple phase difference is less than an initial ripple value that is output by each power module without modulation.

With reference to the first aspect, in some implementations of the first aspect, the system further includes: the phase frequency signal of the adjustment unit includes a primary phase frequency signal and a secondary phase frequency signal. The controller is configured to determine a primary adjustment unit based on the phase frequency signal of each adjustment unit in the working mode, where the primary phase frequency signal is a phase frequency signal generated by the primary adjustment unit. The controller is further configured to determine a secondary adjustment unit, where the secondary adjustment unit is an adjustment unit in the working mode other than the primary adjustment unit, and the secondary phase frequency signal is a phase frequency signal generated by the secondary adjustment unit. The controller is further configured to adjust the secondary phase frequency signal, so that a phase difference between each secondary phase frequency signal and the primary phase frequency signal is any integer multiple of the ripple phase difference. The controller is and further configured to generate the output power signal based on the primary phase frequency signal and the secondary phase frequency signal.

According to this solution, the controller may determine the primary adjustment unit and the secondary adjustment unit, and modulate the phase frequency signal of the primary/secondary adjustment unit, that is, adjust a phase difference between the secondary phase frequency signal and the primary phase frequency signal to any integer multiple of the ripple phase difference. Therefore, phases of the power modules are interleaved and superimposed, and an output current or voltage is partially offset. That is, a ripple value of the output power signal is reduced, so that a total ripple current is reduced, and power supply efficiency and power density of the power system are improved.

With reference to the first aspect, in some implementations of the first aspect, the system further includes: the controller is configured to perform phase shift modulation on a primary ripple signal and a secondary ripple signal to generate the output power signal.

According to this solution, the controller performs phase shift modulation on the primary ripple signal and the secondary ripple signal based on the ripple phase difference, that is, adjusts the phase difference between the secondary phase frequency signal and the primary phase frequency signal to any integer multiple of the ripple phase difference, so that a ripple value of the output power signal is reduced, and power supply efficiency and power density of the power system are improved.

With reference to the first aspect, in some implementations of the first aspect, the system further includes: the primary adjustment unit is any adjustment unit in the working mode.

With reference to the first aspect, in some implementations of the first aspect, the system further includes: the ripple phase difference is a ratio of 360 degrees to the quantity of power modules currently in the working mode.

With reference to the first aspect, in some implementations of the first aspect, the system further includes M filter units. The filter unit receives an alternating current voltage or a direct current voltage of a system input port, and each filter unit is connected to at least one of the N power modules in parallel or in series; or the filter unit outputs an alternating current voltage or a direct current voltage to the target load, and each filter unit is connected to at least one of the N power modules in parallel or in series. M is a positive integer less than or equal to N.

According to this solution, a ripple value of the output power signal is reduced, and a requirement on a filtering capability of the filter unit in the power system is lowered. Therefore, in an ideal state, the power system needs only one filter that can meet a single-module filtering capability. That is, the filter unit in the power system is not limited to corresponding to each power module, or one filter unit may correspond to a plurality of power modules, or a plurality of power modules in the power system directly share one filter unit. According to this method, the filter unit can be flexibly configured, and this helps reduce a total size and total costs of the power system.

According to this solution, a size of the filter unit may be directly adjusted based on a ripple current. The ripple current is reduced, a filtering requirement of the system or a single power module on the filter unit is lowered, and the filter unit may reduce a size of an inductor or a capacitor, thereby reducing a size of the filter unit in the system, reducing total costs of the power system, and properly saving space.

According to a second aspect, a power system control method is provided. A power system includes N power modules, N adjustment units, and a controller, the N power modules include a power conversion circuit, the N adjustment units are one-to-one coupled to the N power modules, and the controller is coupled to the N adjustment units. The method includes: the N power modules receive an alternating current voltage or a direct current voltage, and outputs the alternating current voltage or the direct current voltage to a target load through the power conversion circuit. The N adjustment units generate status signals and phase frequency signals based on working states of the corresponding power modules. The controller obtains the status signal and the phase frequency signal of each adjustment unit, and generates an output power signal based on the status signal and the phase frequency signal. The adjustment unit further obtains the output power signal, and adjusts an output power of the corresponding power module based on the output power signal. N is a positive integer greater than or equal to 2.

According to the power system provided, the corresponding adjustment units of the plurality of power modules may generate the status signals and the phase frequency signals based on the working statuses, and send a current status signal and a current phase frequency signal of a power module to the controller. The controller may generate an output power signal based on the current status signal and the current phase frequency signal of the power module, so that the adjustment unit adjusts an output power of the corresponding power module. In this way, a ripple value of the output power is reduced, a system loss is reduced, and system efficiency and power density are improved.

With reference to the second aspect, in some implementations of the second aspect, the method further includes: that the controller obtains the status signal and the phase frequency signal of each adjustment unit, and generates an output power signal based on the status signal and the phase frequency signal includes: determining a ripple phase difference of the power module currently in a working mode based on the status signal; and generating the output power signal based on the ripple phase difference and the phase frequency signal of the adjustment unit.

The solution provides a method for determining the output power signal based on the ripple phase difference of the power module in the working mode. According to the method, a ripple value of an output power signal of the power system can be reduced, thereby improving system efficiency.

With reference to the second aspect, in some implementations of the second aspect, the method further includes: the determining a ripple phase difference of the power module currently in a working mode based on the status signal includes: determining a quantity of power modules currently in the working mode based on the status signal; and determining the ripple phase difference based on the quantity of power modules currently in the working mode.

The solution provides a method for determining the ripple phase difference based on the quantity of power modules currently in the working mode. According to the method, a ripple value of a real-time output power signal of the power system can be reduced, and this helps improve system efficiency.

With reference to the second aspect, in some implementations of the second aspect, the method further includes: a ripple value of the output power signal is less than a ripple value of the phase frequency signal of each adjustment unit.

In the solution, the ripple value includes a ripple current and a ripple voltage, and a ripple value of the output power signal determined based on the ripple phase difference is less than an initial ripple value that is output by each power module without modulation.

With reference to the second aspect, in some implementations of the second aspect, the phase frequency signal of the adjustment unit includes a primary phase frequency signal and a secondary phase frequency signal, and the method further includes: determining a primary adjustment unit based on the phase frequency signal of each adjustment unit in the working mode, where the primary phase frequency signal is a phase frequency signal generated by the primary adjustment unit; determining a secondary adjustment unit, where the secondary adjustment unit is an adjustment unit in the working mode other than the primary adjustment unit, and the secondary phase frequency signal is a phase frequency signal generated by the secondary adjustment unit; adjusting the secondary phase frequency signal, so that a phase difference between each secondary phase frequency signal and the primary phase frequency signal is any integer multiple of the ripple phase difference; and generating the output power signal based on the primary phase frequency signal and the secondary phase frequency signal.

According to this solution, the controller may determine the primary adjustment unit and the secondary adjustment unit, and modulate the phase frequency signal of the primary/secondary adjustment unit, that is, adjust a phase difference between the secondary phase frequency signal and the primary phase frequency signal to any integer multiple of the ripple phase difference. Therefore, phases of the power modules are interleaved and superimposed, and an output current or voltage is partially offset. That is, a ripple value of the output power signal is reduced, so that a total ripple current is reduced, and power supply efficiency and power density of the power system are improved.

With reference to the second aspect, in some implementations of the second aspect, the method further includes: the generating the output power signal based on the primary phase frequency signal and the secondary phase frequency signal includes: performing phase shift modulation on a primary ripple signal and a secondary ripple signal to generate the output power signal.

According to this solution, the controller performs phase shift modulation on the primary ripple signal and the secondary ripple signal based on the ripple phase difference, that is, adjusts the phase difference between the secondary phase frequency signal and the primary phase frequency signal to any integer multiple of the ripple phase difference, so that a ripple value of the output power signal is reduced, and power supply efficiency and power density of the power system are improved.

With reference to the second aspect, in some implementations of the second aspect, the method further includes: the primary adjustment unit is any adjustment unit in the working mode.

With reference to the second aspect, in some implementations of the second aspect, the method further includes: the ripple phase difference is a ratio of 360 degrees to the quantity of power modules currently in the working mode.

With reference to the second aspect, in some implementations of the second aspect, the method further includes: the power system further includes M filter units. The filter unit receives an alternating current voltage or a direct current voltage of a system input port, and each filter unit is connected to at least one of the N power modules in parallel or in series; or the filter unit outputs an alternating current voltage or a direct current voltage to the target load, and each filter unit is connected to at least one of the N power modules in parallel or in series. M is a positive integer less than or equal to N.

According to this solution, a ripple value of the output power signal is reduced, and a requirement on a filtering capability of the filter unit in the power system is lowered. Therefore, in an ideal state, the power system needs only one filter that can meet a single-module filtering capability. That is, the filter unit in the power system is not limited to corresponding to each power module, or one filter unit may correspond to a plurality of power modules, or a plurality of power modules in the power system directly share one filter unit. According to this method, the filter unit can be flexibly configured, and this helps reduce a total size and total costs of the power system.

According to this solution, a size of the filter unit may be directly adjusted based on a ripple current. The ripple current is reduced, a filtering requirement of the system or a single power module on the filter unit is lowered, and the filter unit may reduce a size of an inductor or a capacitor, thereby reducing a size of the filter unit in the system, reducing total costs of the power system, and properly saving space.

According to a third aspect, a power supply device is provided. The power supply device includes the power system according to the first aspect, or the power system using the power system control method according to the second aspect.

DETAILED DESCRIPTION OF EMBODIMENTS

The following describes solutions of the embodiments with reference to the accompanying drawings.

The solutions provided in the embodiments may be applied to various power systems, which may be a site energy power system, an uninterruptible power system (UPS), a new energy grid-connected photovoltaic system, and the like. The solutions provided in the embodiments may also be applied to a power supply device. The power supply device may provide an alternating current power supply or a direct current power supply for a target load device. The target load may be any element or device that consumes power, for example, may be a terminal device such as a mobile phone, a computer, or a vehicle-mounted device, or may be an electrical device. This is not limited. The power supply device includes the foregoing power system, and may be used in a site power system, a server power system, a data center power system, an inverter power system, and the like. The site power system may be understood as a power supply that supplies power to a radio access network device. To facilitate understanding of embodiments, the following first describes a power system applicable to embodiments in detail with reference to FIG. 1.

Figure 1:
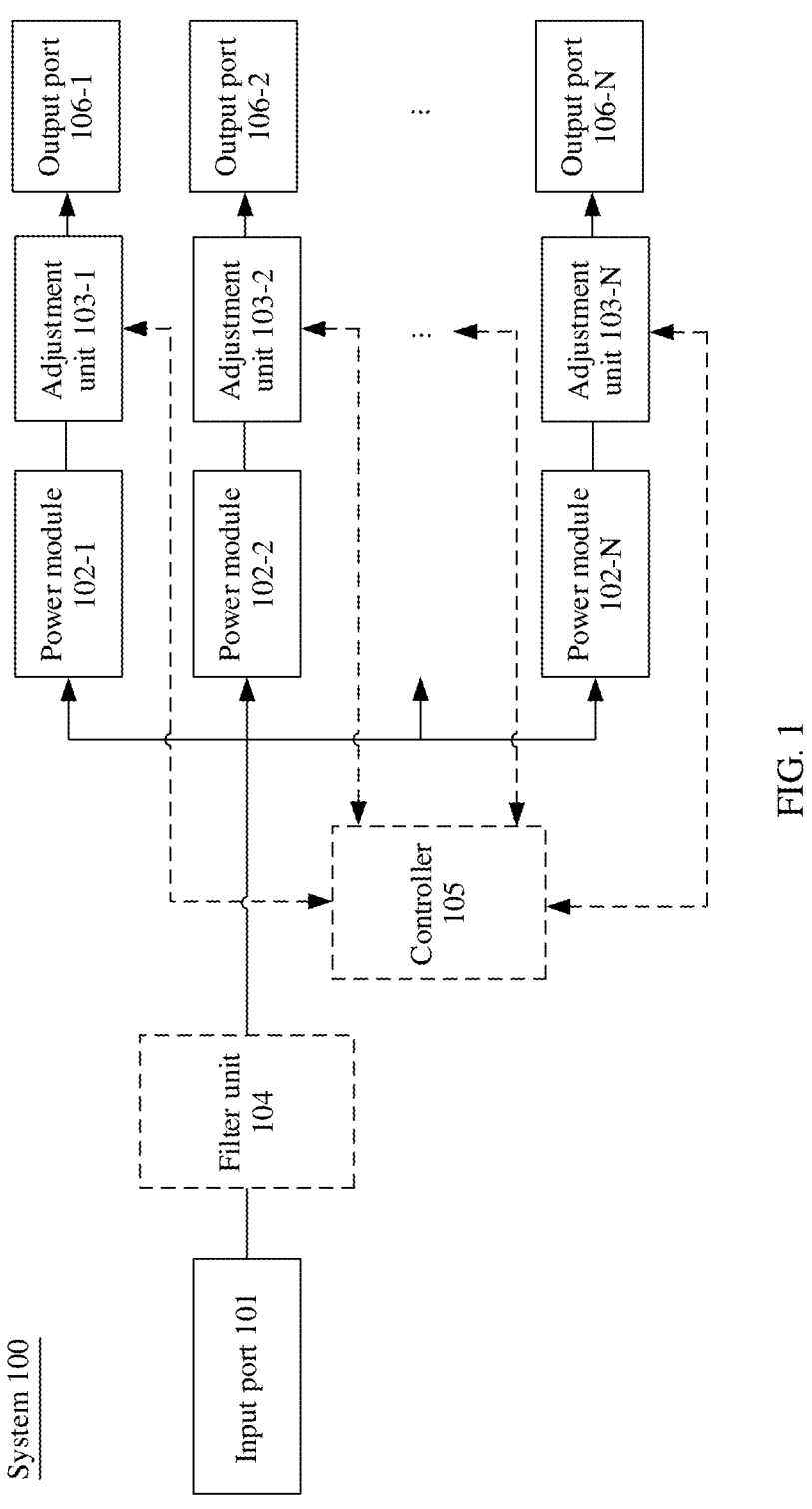
FIG. 1 is a diagram of a system architecture of a power system applicable to an embodiment.

FIG. 1 is a diagram of an architecture of a power system 100 according to an embodiment.

FIG. 1 shows a parallel input power system. The power system includes an input port 101. The input port may be an alternating current input port or a direct current input port, in other words, may be determined based on an input end signal of the power system during actual application. For example, an input end of the power system is an alternating current signal, that is, a current signal or a voltage signal output by an alternating current port, and the alternating current signal or voltage signal is input into a circuit of the system through the input port. An input end is a direct current signal, that is, a signal output by a direct current port, and a direct current signal or voltage signal is input into a circuit of the system.

The power system further includes N power modules, and the N power modules may be connected in parallel, for example, power modules 102-1 to 102-N shown in FIG. 1. N is greater than or equal to 2, and N is a positive integer. The power module includes a power conversion circuit, and the power conversion circuit may receive an alternating current/direct current voltage or an alternating current/direct current, convert the alternating current/direct current voltage or the alternating current/direct current into an alternating current/direct current voltage or an alternating current/direct current, and output the alternating current/direct current voltage or the alternating current/direct current to a target load. It should be understood that, in the power system shown in FIG. 1, the power conversion circuit may be an alternating current/direct current conversion circuit, or may be a direct current/direct current conversion circuit, or may be an alternating current/alternating current conversion circuit, or may be a direct current/alternating current conversion circuit. The power conversion circuit may include functional units such as a filter circuit, a rectifier circuit, and an inverter circuit. Each power module is configured to: receive electric energy from the input end of the power system, implement electric energy conversion through the filter circuit and the inverter circuit, and output electric energy through an output end of the power system.

The power system may further include N adjustment units, for example, adjustment units 103-1 to 103-N shown in FIG. 1. The N adjustment units are one-to-one coupled to the N power modules. The adjustment unit 103-1 is coupled to the power module 102-1, the adjustment unit 103-2 is coupled to the power module 102-2, and so on. Each adjustment unit is configured to collect a current working status of the corresponding power module after the power system supplies power, and generate a status signal and a phase frequency signal based on the working status. The working status may be understood as a working situation of each power module after the system supplies power, and may be represented by a working condition parameter, for example, a status parameter and a phase frequency parameter. The status parameter may be understood as working status information of the current power module, and may be represented by the status signal. The phase frequency parameter may be understood as working phase information and working frequency information of the current power module, and may be represented by the phase frequency signal. The adjustment unit may be a phase frequency control unit, or may be another module that can implement the function. In this embodiment, only the adjustment unit is used as an example for description. This is not limited in this embodiment.

The power system may further include a controller. The controller may be connected to each adjustment unit through a control line, and is configured to: receive the status signal and the phase frequency signal of the corresponding power module that are sent by the adjustment unit, generate an output power signal based on the status signal and the phase frequency signal, and send the output power signal to the adjustment unit, to adjust an output power of the corresponding power module.

The controller may determine, based on the status signal of the power module, whether the power module is currently in a working mode.

The status signal of the power module may be, for example, a frequency signal, a voltage signal, a phase signal, and a newly added address signal. This is not limited in this embodiment.

The working mode may be understood as follows: after the power system supplies power, some power modules in the power modules connected in parallel cannot enter a working state due to faults or other reasons, or can enter the working state, but do not receive a scheduling notification from the controller. In other words, a power module that does not actually work is not included in actual working power modules, and only an online working power module has an actual impact on efficiency of the power system. The power module may be referred to as a power module currently in the working mode, or may be referred to as an online power module.

In a possible implementation, the controller may determine, based on a threshold of a status signal and an actual load requirement in a case of parallel power supply, whether a power module can enter the working mode. Alternatively, the controller may customize a determining rule based on the status signal. For example, when the status signal is "0", the controller determines that the power module does not enter the working mode, and when the status signal is "1", the controller determines that the power module enters the working mode. A determining manner may be defined based on a specific implementation. The determining manner is not limited in this embodiment.

In a possible implementation, the controller may determine a ripple phase difference of the power module currently in the working mode, and generate the output power signal based on the ripple phase difference and the phase frequency signal of the adjustment unit.

For example, the controller may determine a quantity of power modules currently in the working mode based on the status signal of the corresponding power module, and determine the ripple phase difference based on the quantity of power modules currently in the working mode. The output power signal is used by the adjustment unit to adjust a current output power of the power module.

A ripple value of the output power signal is less than a ripple value of the phase frequency signal of each adjustment unit. The ripple value includes a ripple current or a ripple voltage, and may be determined by using an amplitude of an output ripple current.

It should be noted that the ripple phase difference is a phase difference value of an input or output ripple current of each power module currently in the working mode, and the phase difference is a specific value.

In an embodiment, the controller may perform, based on the determined ripple phase difference and phase frequency signal, phase shift modulation on a ripple signal of each power module in the working mode, to generate the output power signal. The phase shift modulation is a modulation scheme in which data is transmitted by using a signal with a phase difference. In this embodiment, it may be understood that a part of an output ripple current is offset through phase shift difference interleaving and superimposition.

It should be understood that the controller may also be referred to as a control center, a control unit, or a control module, or may be another module implementing the function. In this embodiment, only the controller is used as an example for description. This is not limited in this embodiment.

The power system may further include M filter units. The filter unit may be used as an input filter circuit to receive an alternating current voltage or a direct current voltage of a system input port, or may be used as an output filter circuit to output an alternating current voltage or a direct current voltage to the target load. M is a positive integer less than or equal to N. A filter unit 104 is shown in FIG. 1.

It should be understood that a main function of the filter unit in the power module is to reduce a ripple current at an input port or an output port of the power module, to ensure that an input end has little impact on a harmonic of a power grid, reduce board noise, ensure component reliability, and ensure stable power supply quality at an output end. For example, an inductor element and a capacitor element are used to reduce an alternating current component in a pulsating direct current voltage of the power module, and retain a direct current component thereof, so that a ripple coefficient of an output voltage is reduced, to ensure power supply quality and efficiency.

It should be noted that a ripple is an alternating current component in a direct current voltage. The direct current voltage should be a fixed value. However, in most cases, the direct current voltage is obtained after rectification and filtering on an alternating current voltage. Due to incomplete filtering, there are remaining alternating current components. Even if a battery is used to supply power, a ripple is also generated due to load fluctuation. Actually, an output voltage of a best reference voltage source also has a ripple.

It should be understood that the ripple may be simply understood as a peak-to-peak value of an alternating current component in a direct current voltage. For example, if a ripple voltage is 10 mV, and an output voltage is 100 V, ripple coefficient=ripple voltage/output voltage=10 mV/100 V=0.01%, that is, $\frac{1}{10,000}$. A smaller ripple coefficient indicates a higher requirement on a filtering capability of the power system. In other words, the power system needs a filter with a stronger filtering capability to filter out an alternating current component in a direct current voltage. A main factor that affects the filtering capability of the filter is a size of an inductor element or a capacitor element of the filter. If the ripple coefficient is small, the filter can need a larger inductor or capacitor element to achieve a filtering effect, so as to meet a corresponding ripple requirement.

In this embodiment, the controller may perform phase shift modulation on the ripple signals of the power modules in the working mode based on the determined ripple phase difference and phase frequency signal, so that a ripple current or a ripple voltage of the output power signal is reduced. A system loss is reduced, and efficiency is improved. Further, a filtering requirement of the system on a filter is lowered.

Each of the M filter units may be connected to at least one of the N power modules in parallel or in series.

In a possible implementation, a total output ripple current may be reduced through phase shift modulation, and a filtering capability of only one power module in the entire power system needs to be met. That is, each power module does not need an independent filter. In other words, M is equal to 1, and one filter unit may be included. The filter unit is connected to each power module in parallel and corresponds to each power module in the power system. The correspondence means that one filter unit can implement a filtering requirement of each power module in the power system, for example, the filter unit 104 in FIG. 1. Alternatively, M is greater than 1, and a plurality of filter units may be included and separately correspond to some power modules in the power system. The correspondence herein may be understood as: Some power modules share one filter unit. For example, M is equal to 2, and N is equal to 10. One filter unit may be connected to five power modules in parallel, and the other filter unit may be connected to the remaining five power modules in parallel, to implement sharing of the filter units.

In a possible implementation, the filter units may be one-to-one connected to the power modules in series. That is, M is equal to N. In this case, a total output ripple current may be reduced through phase shift modulation, a filtering requirement of a system on a filter is lowered, and a filtering requirement of each power module is lowered. Therefore, each filter unit can reduce a size of a capacitor element or an inductor element, thereby reducing a size of the filter unit and reducing costs.

It should be understood that the filter unit may be a filter, may include only an inductor, or may be a filter circuit including another component. In this embodiment, only the filter unit is used as an example for description. This is not limited in this embodiment.

The power system may further include a plurality of output ports 106. As shown in FIG. 1, the output ports include output ports 106-1, 106-2, ..., 106-N. The direct current voltage or the alternating current voltage is transmitted to the target load through the output port. The output port may be a direct current port, or may be an alternating current port.

The power system implements electric energy conversion from an alternating current input or a direct current input to an alternating current output or a direct current output through the plurality of power modules, and supplies power to a direct current load through the output ports.

Figure 2:
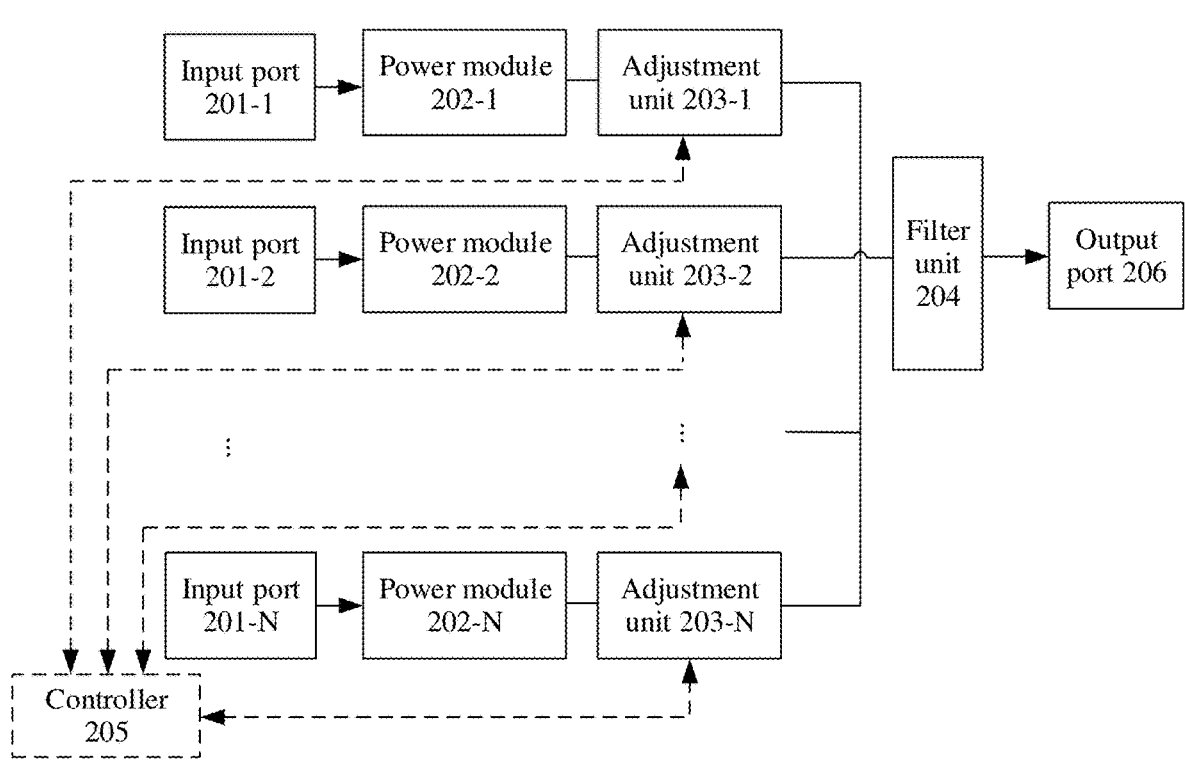
FIG. 2 is a diagram of another system architecture of a power system applicable to an embodiment.

FIG. 2 is a diagram of another architecture of a power system according to an embodiment.

As shown in FIG. 2, FIG. 2 shows a parallel output power system. The power system includes a plurality of input ports 201, for example, input ports 201-1 to 201-N shown in FIG. 2. The power system further includes N power modules, for example, power modules 202-1 to 202-N shown in FIG. 2. N is greater than or equal to 2, and N is a positive integer. The plurality of input ports are one-to-one coupled to the N power modules. As shown in FIG. 2, the input port 201-1 is coupled to the power module 202-1, the input port 201-2 is coupled to the power module 202-2, and so on.

The power system may further include N adjustment units, for example, adjustment units 203-1 to 203-N shown in FIG. 2. The N adjustment units are one-to-one coupled to the N power modules. The adjustment unit 203-1 is coupled to the power module 202-1, the adjustment unit 203-2 is coupled to the power module 202-2, and so on.

The power system may further include a controller, for example, a controller 205 shown in FIG. 2. The controller may be connected to each adjustment unit through a control line.

The power system may further include M filter units. The filter unit may be used as an input filter circuit to receive an alternating current voltage or a direct current voltage of a system input port, or may be used as an output filter circuit to output an alternating current voltage or a direct current voltage to the target load. M is a positive integer less than or equal to N. A filter unit 204 is shown in FIG. 2.

The power system may further include an output port, for example, an output port 206 shown in FIG. 2. A direct current voltage or an alternating current voltage is transmitted to the target load through the output port. The output port may be a direct current port, or may be an alternating current port.

It should be understood that, in this embodiment, functions of the units and modules in the system 200 shown in FIG. 2 are basically the same as functions of the system 100 shown in FIG. 1, and the power system constructed by using the architecture shown in FIG. 2 may implement all functions of the power system shown in FIG. 1. To avoid repetition, details are not described herein again in this embodiment.

Figure 3:
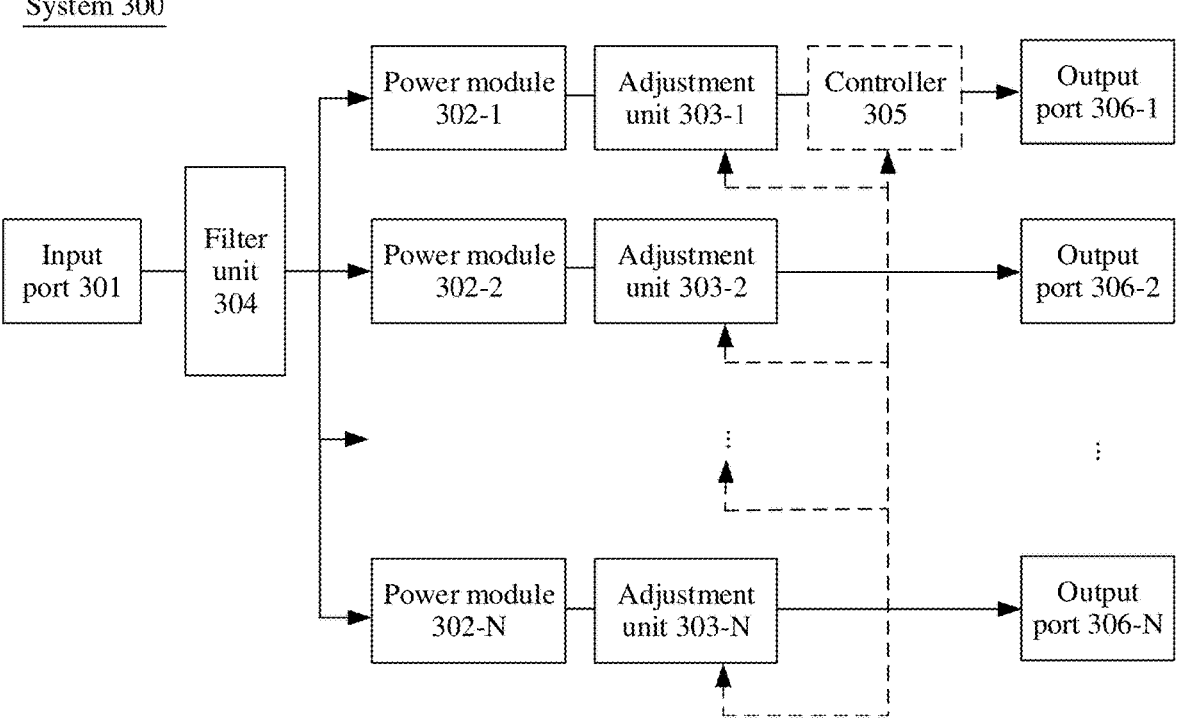
FIG. 3 is a diagram of another system architecture of a power system applicable to an embodiment.

FIG. 3 is a diagram of another architecture of a power system according to an embodiment.

FIG. 3 provides another controller connection manner based on the parallel input power system shown in FIG. 1.

As shown in FIG. 3, a controller 305 shown in FIG. 3 is coupled to a conversion circuit. Like the controller 105 in the system 100, the controller 305 is connected to each adjustment unit through a control line, and is configured to: receive a status signal and a phase frequency signal of a corresponding power module that are sent by an adjustment unit, generate an output power signal based on the status signal and the phase frequency signal, and send the output power signal to the adjustment unit, to adjust an output power of the corresponding power module.

The controller is configured to perform phase shift modulation on a ripple signal of each power module in a working mode based on a determined ripple phase difference and the phase frequency signal, so that a ripple current or a ripple voltage of the output power signal is reduced.

In a possible implementation, a function of the controller may also be preconfigured on one of the adjustment units. The adjustment unit may be connected to another adjustment unit through a control line, collect a working status of each power module through the control line, determine a status signal and a phase frequency signal to determine a ripple phase difference, and further perform phase shift modulation on a ripple signal of each power module in the working mode based on the ripple phase difference and the phase frequency signal, so that a ripple current or a ripple voltage of an output power signal is reduced. The function of the controller is implemented.

It should be understood that the power system shown in FIG. 3 is described by using the parallel input system architecture shown in FIG. 1 as an example. A connection manner of the controller in the power system 300 shown in FIG. 3 is also applicable to the power system 200 shown in FIG. 2. This is not limited in this embodiment.

Figure 4:
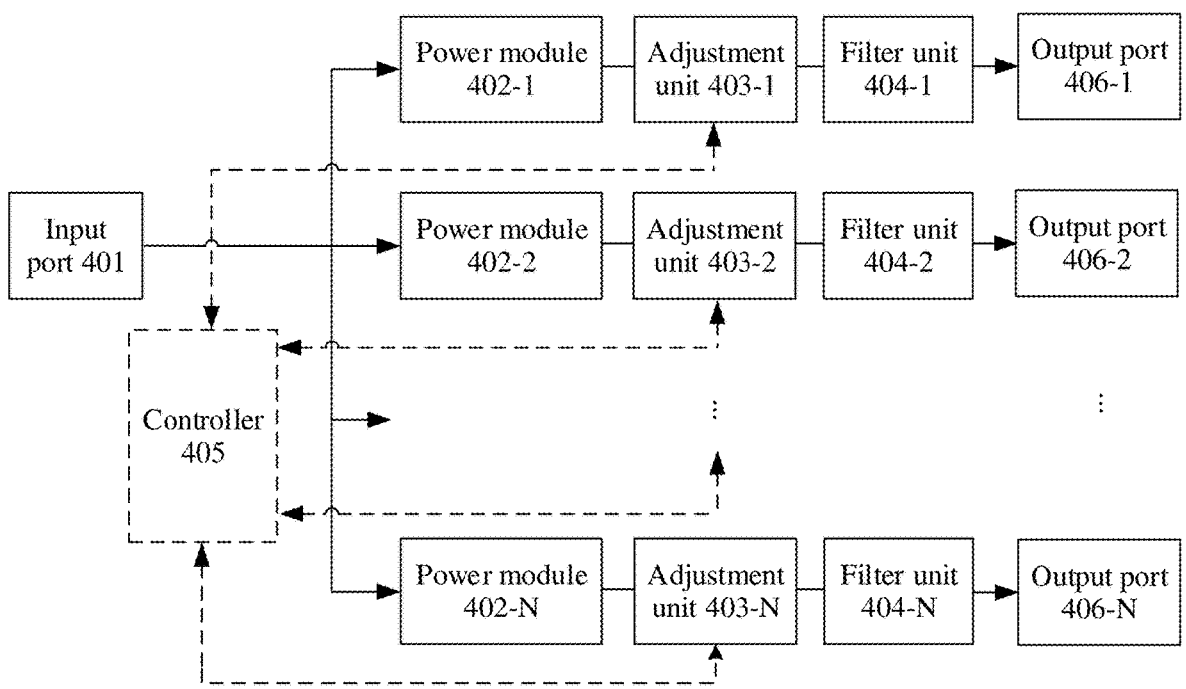
FIG. 4 is a diagram of another system architecture of a power system applicable to an embodiment.

FIG. 4 is a diagram of another architecture of a power system according to an embodiment.

FIG. 4 provides another connection manner of a filter unit based on the parallel input power system shown in FIG. 1.

As shown in FIG. 4, filter units shown in FIG. 4 include N filter units, and the filter units 404 are one-to-one coupled to power modules, for example, filter units 404-1 to 404-N shown in FIG. 4. The filter unit 404-1 is coupled to a power module 402-1, the filter unit 404-2 is coupled to a power module 402-2, and so on. Therefore, each filter unit needs to meet a filtering requirement of each corresponding power module. In this embodiment, the controller can reduce an output ripple current of each power module, reduce a system loss, and improve efficiency through phase shift modulation. Further, the output ripple current of each power module is reduced, and a filtering requirement of the system on the filter unit corresponding to each power module is lowered. Therefore, each filter unit can reduce a size of a capacitor element or an inductor element, thereby reducing a size of the filter unit and reducing costs. It should be understood that the power system 400 shown in FIG. 4 is described by using the parallel input system architecture shown in FIG. 1 as an example. A connection manner of the filter unit in the power system shown in FIG. 4 is also applicable to the power system 200 shown in FIG. 2. Likewise, a connection manner of a controller architecture shown in FIG. 3 is also applicable to the power system shown in FIG. 4. This is not limited in this embodiment.

It should be understood that, during actual application, connection manners of different function modules in the system architectures shown in FIG. 1 to FIG. 4 may be flexibly combined and used based on an actual requirement. This is not limited in embodiments.

Figure 5:
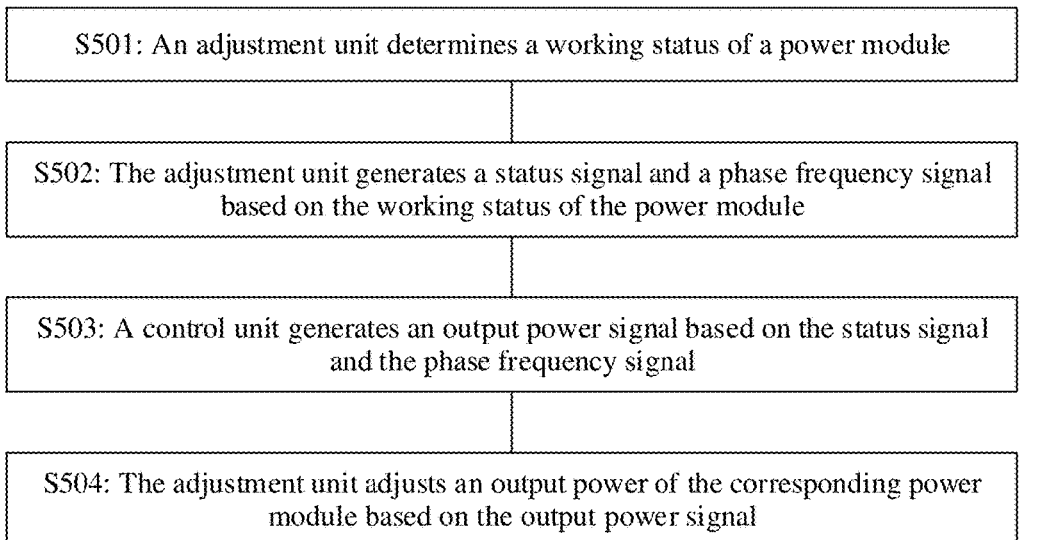
FIG. 5 is a schematic diagram of a power system control method applicable to a specific embodiment.

FIG. 5 is a schematic diagram of a power supply control method 500 according to an embodiment. The method 500 includes the following steps.

S501: An adjustment unit determines a working status of a power module.

After a power system supplies power, each adjustment unit collects a current working status of a corresponding power module. The working status may be represented by a status parameter and a phase frequency parameter, or may be represented by other data or information that can represent the working status. This is not limited in this embodiment.

S502: The adjustment unit generates a status signal and a phase frequency signal based on the working status of the power module.

The adjustment unit converts the collected working status of the power module into the status signal and the phase frequency signal. For example, the adjustment unit may convert the collected status parameter into the status signal, convert a phase parameter into a phase signal, and convert a frequency parameter into a frequency signal. Alternatively, another parameter such as a voltage value or a current value may be converted. This is not limited in this embodiment.

The adjustment unit sends the generated status signal and phase frequency signal to a control unit.

S503: The control unit generates an output power signal based on the status signal and the phase frequency signal, and sends the output power signal to the adjustment unit, to adjust an output power of the corresponding power module.

The controller receives the status signal and the phase frequency signal of the corresponding power module that are sent by the adjustment unit, generates the output power signal based on the status signal and the phase frequency signal, and sends the output power signal to the adjustment unit, to adjust the output power of the corresponding power module.

The controller may generate the output power signal by using the following steps:

a. The controller may determine, based on the status signal of the power module, whether the power module is currently in a working mode.

The controller may determine, based on a threshold of the status signal, whether the power module can enter the working mode. For example, the status signal is a frequency signal, and a determining rule may be that when the frequency signal is greater than or equal to 50 Hz, the power module can enter a working state. On the other hand, when the frequency signal is less than 50 Hz, the power module cannot enter the working state. For another example, the status signal is a voltage signal, and a determining rule may be that when the voltage signal is greater than or equal to 120 V, the power module can enter a working state. On the other hand, when the voltage signal is less than 120 V, the power module cannot enter the working state. A determining manner may be defined based on a specific status signal. The determining manner is not limited in this embodiment.

The controller may also define a determining rule based on the status signal. For example, when the status signal is "0", it is determined that the power module does not enter the working mode; and when the status signal is "1", it is determined that the power module enters the working mode. For another example, when the status signal is "O", it is determined that the power module does not enter the working mode; and when the status signal is "N", it is determined that the power module enters the working mode. A determining manner may be defined based on a specific implementation. The determining manner is not limited in this embodiment.

The controller may further make further determinations with reference to an actual load requirement in a case of parallel power supply. For example, according to the actual load requirement, only three power modules need to enter the working mode to meet the requirement. The controller selects only three power modules to actually work, and remaining power modules do not need to enter the working mode even if a determining condition is met.

b. The controller determines a ripple phase difference of a power module currently in the working mode.

The controller may determine a quantity of power modules currently in the working mode based on the status signal of the corresponding power module, and determine the ripple phase difference based on the quantity of power modules currently in the working mode.

A specific method for calculating the ripple phase difference is a ratio of 360 degrees to the quantity of power modules currently in the working mode.

c. The controller generates the output power signal based on the ripple phase difference and the phase frequency signal.

The controller determines a primary power module and a secondary power module in the power modules in the working mode. The primary power module may be any power module that initially works, or may be determined based on a system configuration, for example, determined based on a quantity of working modules and a power supply requirement in the system. The secondary module is a remaining power module in the working mode. In this embodiment, a phase frequency signal of the primary module is a phase frequency signal generated by a corresponding primary adjustment unit, and is referred to as a primary phase frequency signal. A phase frequency signal of the secondary module is a phase frequency signal generated by a corresponding secondary adjustment unit, and is referred to as a secondary phase frequency signal. The secondary phase frequency signal may refer to the primary phase frequency signal. Therefore, the primary module may be understood as a standard module, and the primary phase frequency signal is a scalar.

The controller adjusts the phase frequency signal of the secondary module based on the ripple phase difference. For example, the controller adjusts a phase difference between a phase frequency signal of each secondary module and the primary phase frequency signal to any integer multiple of the ripple phase difference. For example, there are three modules, and a phase difference is 120°, a phase of a primary module (a module 1) is 0°, a phase of a module 2 is 120°, and a phase of a module 3 is 240°. A phase difference between the module 2 and the primary module is one time the ripple phase difference, a phase difference between the module 3 and the primary module is twice time the ripple phase difference. The integer multiple is, for example, 0, 1, or −1.

The controller generates the output power signal based on the primary phase frequency signal and the secondary phase frequency signal.

S504: The adjustment unit adjusts the output power of the corresponding power module based on the output power signal.

It should be understood that the controller adjusts the phase difference between the phase frequency signal of each secondary module and the primary phase frequency signal to any integer multiple of the ripple phase difference. In this case, waveforms of output ripple currents or ripple voltages of the power modules are interleaved and superimposed, and ripple currents or voltages are reduced. That is, a ripple value of the output power signal is less than a ripple value of the phase frequency signal of each adjustment unit. The ripple value includes a ripple current or a ripple voltage, and may be determined by measuring an amplitude or a peak-to-peak value of a waveform of the output ripple current.

Figure 6:
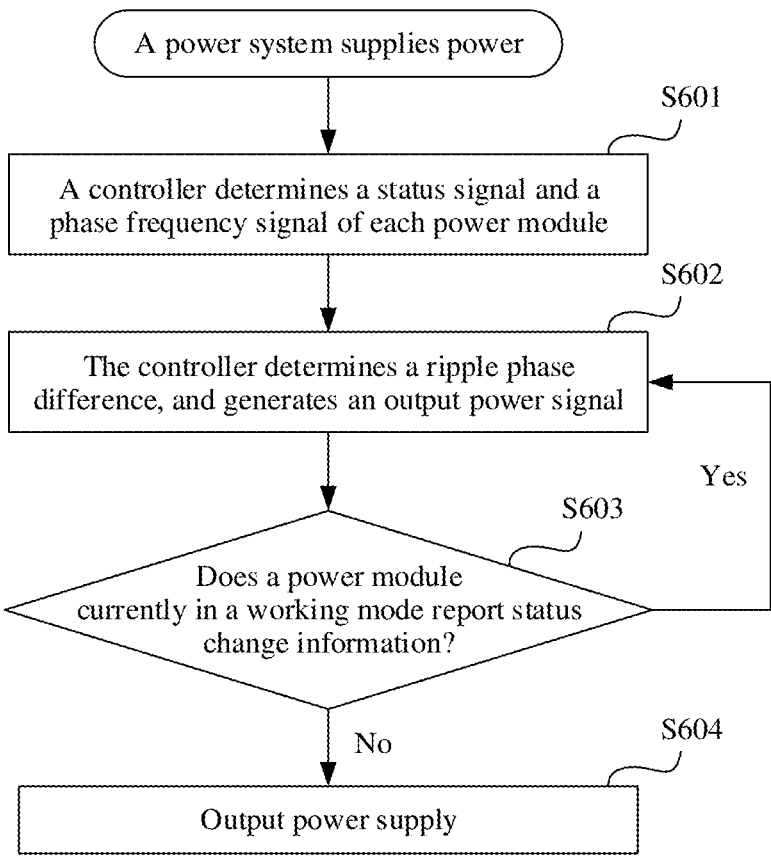
FIG. 6 is a flowchart of a power system control method applicable to a specific embodiment.

FIG. 6 is a flowchart of a power supply control method 600 according to an embodiment, and further describes the control method shown in FIG. 5 in detail. The method may include steps S601 to S604. In the following description, the architecture of the power system shown in FIG. 1 is used as an example for description.

S601: A controller determines a status signal and a phase frequency signal of each power module.

In this embodiment, after the power system supplies power, P power modules in N power modules in the power system may normally receive a sent signal. That is, the P power modules may actively send working statuses to the controller. P is a positive integer less than or equal to N.

In an embodiment, the P power modules report the working statuses to the controller by using respective corresponding adjustment units. It should be noted that it is considered that a power module reports a working status to the controller as long as the power module has a normal working capability, and is not limited to completely entering a working state currently.

The controller generates the status signal and the phase frequency signal based on the working status.

In this embodiment, the controller may determine, based on the status signal of the power module, whether the power module is currently in a working mode.

X power modules in the P power modules may enter the working mode based on scheduling of the controller. For example, the controller selects, based on an actual load requirement and a parallel power supply case, power modules working in parallel as power modules in the working mode. X is a positive integer less than or equal to P.

S602: The controller determines a ripple phase difference, and generates an output power signal.

The controller determines the ripple phase difference according to a specific method for calculating the ripple phase difference, which is a ratio of 360 degrees to a quantity of power modules currently in the working mode. That is, the ripple phase difference is 360°/X.

The controller determines a primary power module and a secondary power module in the power modules in the working mode, and adjusts a phase frequency signal of the secondary module based on the ripple phase difference. For example, the controller adjusts a phase difference between a phase frequency signal of each secondary module and a primary phase frequency signal to any integer multiple of 360°/X.

The output power signal is determined based on adjusted primary and secondary phase frequency signals.

S603: Does the power module currently in the working mode reports status change information?

If yes, the controller determines a quantity X1 of power modules currently in the working mode based on latest status information, updates the ripple phase difference based on X1, re-determines primary and secondary modules, re-adjusts a primary phase frequency signal and a secondary phase frequency signal, and determines an output power signal. A determining method is the same as the determining method in S602. If no, step S604 is performed.

S604: Determine the output power signal, and output power supply.

Figure 7:
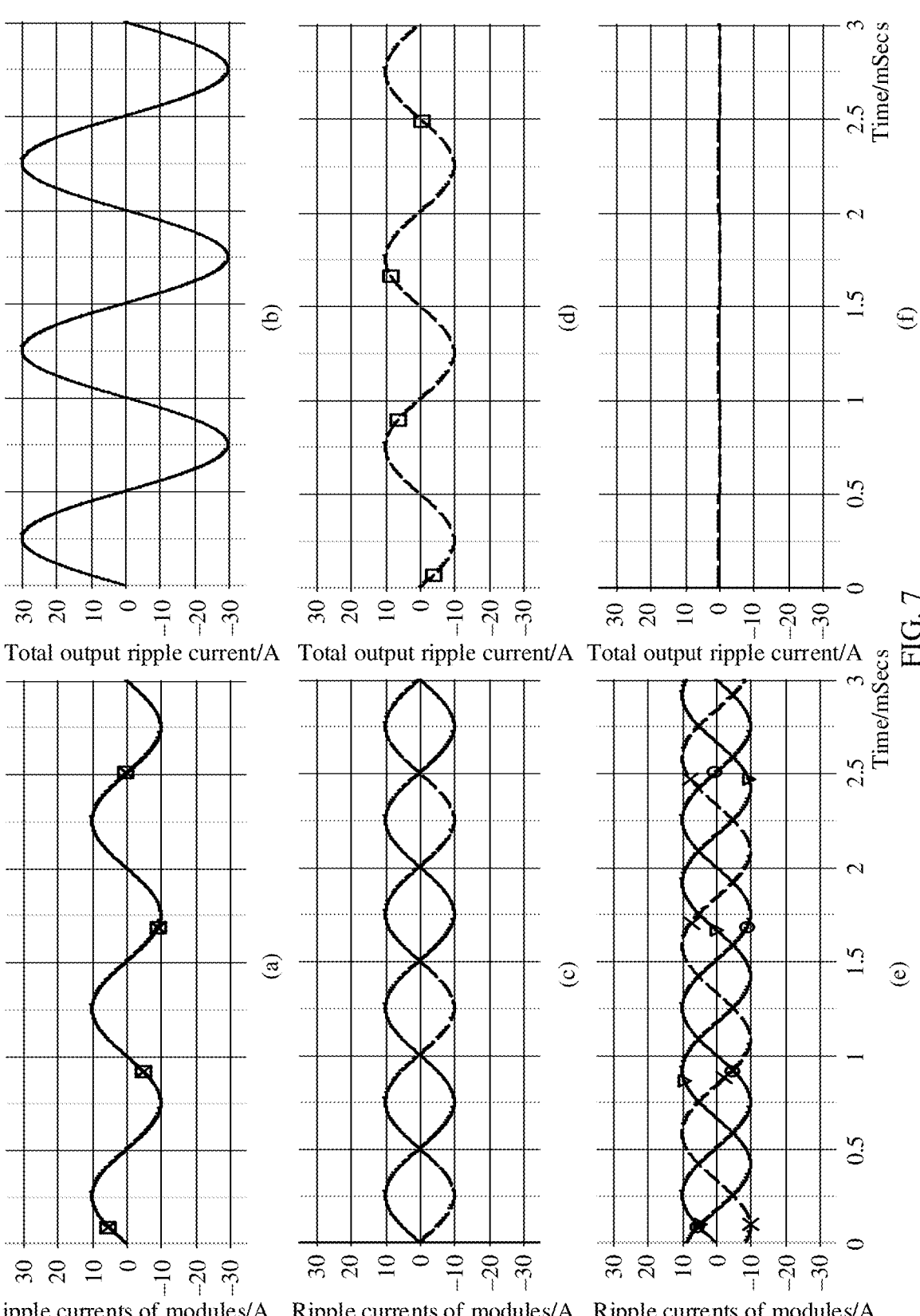
FIG. 7 is a schematic diagram of a phase shift modulation method of a power module applicable to a specific embodiment.

FIG. 7 is a schematic diagram of a phase shift modulation method 700 of a power module according to an embodiment. The phase shift modulation method is also a further detailed description of step S503 in FIG. 5 and step S602 in FIG. 6. In the following description, reducing an output ripple current is used as an example.

It should be understood that, assuming that a power system has no ripple current, a filter may not be required. However, in this embodiment, a plurality of power modules in the power system are connected in parallel. If all the power modules have a same working frequency and a stable phase difference, a ripple current of the system can be greatly reduced.

In this embodiment, a quantity of online power modules is X. To reduce or minimize the output current ripple, the phase shift modulation method may be used to enable a difference between phases of ripples of output currents to be a specific phase difference. In the following example, the quantity X of online power modules is 3.

In FIG. 7, for example, the quantity X of power modules in the working mode is equal to 3. (a) in FIG. 7 is a waveform diagram of ripple currents of the three power modules when phase shift modulation is not performed. Current waveforms of the three power modules are completely overlapping sine waves with ripples of 20 A. (b) in FIG. 7 is a total output ripple current of the three power modules when phase adjustment and control are not performed, and a waveform of the total output current of the three power modules is a sine wave with a ripple of 60 A.

(c) in FIG. 7 is a waveform diagram of ripple currents of the three power modules when phase adjustment and control are performed by using the phase shift modulation method in the embodiments. In this embodiment, phase shift may be first performed on first two modules. That is, a phase difference between the first two modules is 360°/2=180°. Then, phase shift is performed on a third module. In this case, a total output ripple current is reduced. Current waveforms of the three power modules are sine waves with ripples of 20 A. Phase shift is first performed on the two modules, and then phase shift is performed on the other module. In this case, the total output ripple current is smaller than that before phase shift modulation is performed. (d) in FIG. 7 shows an output total ripple current of the three power modules when the phase shift modulation is performed, and a waveform of the total output current of the three power modules is a sine wave with a ripple of 20 A.

(e) in FIG. 7 is a waveform diagram of ripple currents of the three power modules when phase adjustment and control are performed by using a phase shift modulation method in the embodiments. Current waveforms of the three power modules are sine waves with ripples of 20 A. It is assumed that a phase of a primary module is 0°, working frequencies of the primary module and a secondary module are the same, and a phase difference of a secondary module may be determined as 360°/X. That is, the phase difference of each power module is 120°, and phases of the three modules are 0°, 120°, and 240°, respectively. In this case, the total output ripple current is the smallest. (f) in FIG. 7 shows a total output ripple current of the three power modules when phase shift modulation is performed. A waveform of the total output current of the three power modules is a sine wave with a ripple of about 600 nA. Compared with a sine wave with a total output ripple current of 60 A when phase shift modulation is not performed in (b) in FIG. 7, a total output ripple is obviously reduced. That is, the ripple current of the power system can be effectively reduced through phase shift and offset.

According to the power system and the power system control method provided, phase shift modulation may be performed on a ripple signal of each power module in the working mode based on the determined ripple phase difference and phase frequency signal, so that a ripple current or a ripple voltage of an output power signal is reduced. In this way, a filtering requirement of the power system is lowered. In other words, a filtering capability requirement of a filter in the power system is lowered, thereby reducing a size of the filter, improving efficiency and power density of the power system, and saving costs.

Correspondingly, phase shift modulation on a larger quantity of power supplies that work in parallel indicates a smaller total ripple current or voltage, and a lower filtering capability requirement of the power system on the filter. Therefore, in an ideal state, the entire power system may need only one filter that can meet a single-power module filtering capability, to meet the filtering requirement of the system. Further, the filter may be removed from each power module, so that the filter is shared by a plurality of power modules, to directly and effectively reduce costs of the filter, and improve power density and efficiency of the entire power system.

According to the power supply control method provided in embodiments, a status signal and a phase frequency signal may be determined based on a working status of a power module, to determine a ripple phase difference of each power module based on the status signal, and the controller adjusts a phase difference of the phase frequency signal of each power module to the ripple phase difference, to determine an output power signal. Therefore, a ripple current or a ripple voltage of the output power signal is reduced. In this way, a filtering requirement of the power system is lowered. In other words, a filtering capability requirement of a filter in the power system is lowered, thereby reducing a size of the filter, improving efficiency and power density of the power system, and saving costs.

A total ripple current of the system is reduced, to lower the requirement of the system on the filtering capability of the filter, reduce system costs, and improve the power density and the efficiency. Further, in embodiments, a requirement of the system on a filtering capability is lowered, and a filter in each existing independent power module may be shared or even removed, so that a plurality of power modules share a filter, to effectively reduce system costs, and improve power supply efficiency.

Terms such as "component", "module", and "system" indicate computer-related entities, hardware, firmware, combinations of hardware and software, software, or software being executed. For example, a component may be, but is not limited to, a process that runs on a process, a processor, an object, an executable file, a thread of execution, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed by various non-transitory computer-readable media that store various data structures. For example, the components may communicate by using a local and/or remote process and based on a signal having one or more data packets (for example, data from two components interacting with another component in a local system, a distributed system, and/or across a network such as the internet interacting with another system by using the signal).

A person of ordinary skill in the art may be aware that, in combination with the examples described in embodiments, units and algorithm steps may be implemented by electronic hardware or a combination of computer software and electronic hardware. Whether the functions are performed by hardware or software depends on particular applications and design constraints of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided, it should be understood that the systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, and may be located in one position, or may be distributed on a plurality of network units. Some or all of the units may be selected depending on actual requirements to achieve the objectives of the solutions in the embodiments.

In addition, functional units in embodiments may be integrated into one processing unit, each of the units may exist independently physically, or two or more units may be integrated into one unit.

When the functions are implemented in the form of a software functional unit and sold or used as an independent product, the functions may be stored in a non-transitory computer-readable storage medium. Based on such an understanding, the solutions of the embodiments essentially, or the part contributing to the conventional technology, or some of the solutions may be implemented in a form of a software product. The computer software product is stored in a storage medium, and includes several instructions for instructing a computer device (which may be a personal computer, a server, or a network device) to perform all or some of the steps of the methods described in embodiments. The foregoing storage medium includes any medium that can store program code, such as a USB flash drive, a removable hard disk, a read-only memory (ROM), a random access memory (RAM), a magnetic disk, or an optical disc.

It should be further noted that terms such as first, second, and third used in embodiments are for ease of description, and should not be construed as a limitation on the scope of the embodiments.

The foregoing descriptions are merely specific implementations of the embodiments, but the scope of is the embodiments not limited thereto. Any variation or replacement readily figured out by a person skilled in the art within the scope shall fall within the scope of this embodiments.

What is claimed is:

1. A power system, comprising:

N power modules, wherein the N power modules comprise a power conversion circuit, and the N power modules are configured to: receive an alternating current voltage or a direct current voltage; and output the alternating current voltage or the direct current voltage to a target load through the power conversion circuit;

N adjustment units, wherein the N adjustment units are one-to-one coupled to the N power modules, and each adjustment unit is configured to generate a status signal and a phase frequency signal based on a working status of the corresponding power module; and a controller, wherein the controller is coupled to the N adjustment units, and the controller is configured to: obtain the status signal and the phase frequency signal of each adjustment unit, and generate an output power signal based on the status signal and the phase frequency signal, wherein the adjustment unit is further configured to obtain the output power signal, and adjust an output power of the corresponding power module based on the output power signal; and N is a positive integer greater than or equal to 2.

2. The power system according to claim 1, wherein the controller is further configured to:

determine a ripple phase difference of the power module currently in a working mode based on the status signal; and generate the output power signal based on the ripple phase difference and the phase frequency signal of the adjustment unit.

3. The power system according to claim 1, wherein the controller is further configured to:

determine a quantity of power modules currently in the working mode based on the status signal; and determine the ripple phase difference based on the quantity of power modules currently in the working mode.

4. The power system according to claim 1, wherein a ripple value of the output power signal is less than a ripple value of the phase frequency signal of each adjustment unit.

5. The power system according to claim 1, wherein the phase frequency signal of the adjustment unit comprises a primary phase frequency signal and a secondary phase frequency signal; and the controller is further configured to:

determine a primary adjustment unit based on the phase frequency signal of each adjustment unit in the working mode, wherein the primary phase frequency signal is a phase frequency signal generated by the primary adjustment unit;

determine a secondary adjustment unit, wherein the secondary adjustment unit is an adjustment unit in the working mode other than the primary adjustment unit, and the secondary phase frequency signal is a phase frequency signal generated by the secondary adjustment unit;

adjust the secondary phase frequency signal, so that a phase difference between each secondary phase frequency signal and the primary phase frequency signal is any integer multiple of the ripple phase difference; and generate the output power signal based on the primary phase frequency signal and the secondary phase frequency signal.

6. The power system according to claim 5, wherein to generate the output power signal based on the primary phase frequency signal and the secondary phase frequency signal, the controller is further configured to:

perform phase shift modulation on a primary ripple signal and a secondary ripple signal to generate the output power signal.

7. The power system according to claim 5, wherein the primary adjustment unit is any adjustment unit in the working mode.

8. The power system according to claim 2, wherein the ripple phase difference is a ratio of 360 degrees to the quantity of power modules currently in the working mode.

9. The power system according to claim 1, further comprising:

M filter units, wherein the filter unit receives an alternating current voltage or a direct current voltage of a system input port, and each filter unit is connected to at least one of the N power modules in parallel or in series; or the filter unit outputs an alternating current voltage or a direct current voltage to the target load, and each filter unit is connected to at least one of the N power modules in parallel or in series, wherein M is a positive integer less than or equal to N.

10. A power system control method, wherein the power system comprises N power modules, N adjustment units, and a controller, the N power modules comprise a power conversion circuit, the N adjustment units are one-to-one coupled to the N power modules, the controller is coupled to the N adjustment units, and the method comprises:

receiving, by the N power modules, an alternating current voltage or a direct current voltage, and outputting the alternating current voltage or the direct current voltage to a target load through the power conversion circuit;

generating, by the N adjustment units, status signals and phase frequency signals based on working statuses of the corresponding power modules;

obtaining, by the controller, the status signal and the phase frequency signal of each adjustment unit, and generating an output power signal based on the status signal and the phase frequency signal; and obtaining, by the adjustment unit, the output power signal, and adjusting an output power of the corresponding power module based on the output power signal, wherein N is a positive integer greater than or equal to 2.

11. The power system control method according to claim 10, wherein obtaining, by the controller, the status signal and the phase frequency signal of each adjustment unit, and generating the output power signal based on the status signal and the phase frequency signal comprises:

determining a ripple phase difference of the power module currently in a working mode based on the status signal; and generating the output power signal based on the ripple phase difference and the phase frequency signal of the adjustment unit.

12. The power system control method according to claim 10, wherein determining the ripple phase difference of the power module currently in a working mode based on the status signal comprises:

determining a quantity of power modules currently in the working mode based on the status signal; and determining the ripple phase difference based on the quantity of power modules currently in the working mode.

13. The power system control method according to claim 10, wherein a ripple value of the output power signal is less than a ripple value of the phase frequency signal of each adjustment unit.

14. The power system control method according to claim 10, wherein the phase frequency signal of the adjustment unit comprises a primary phase frequency signal and a secondary phase frequency signal, and the method further comprises:

determining a primary adjustment unit based on the phase frequency signal of each adjustment unit in the working mode, wherein the primary phase frequency signal is a phase frequency signal generated by the primary adjustment unit;

determining a secondary adjustment unit, wherein the secondary adjustment unit is an adjustment unit in the working mode other than the primary adjustment unit, and the secondary phase frequency signal is a phase frequency signal generated by the secondary adjustment unit;

adjusting the secondary phase frequency signal, so that a phase difference between each secondary phase frequency signal and the primary phase frequency signal is any integer multiple of the ripple phase difference; and generating the output power signal based on the primary phase frequency signal and the secondary phase frequency signal.

15. The power system control method according to claim 14, wherein generating the output power signal based on the primary phase frequency signal and the secondary phase frequency signal comprises:

performing phase shift modulation on a primary ripple signal and a secondary ripple signal to generate the output power signal.

16. The power system control method according to claim 14, wherein the primary adjustment unit is any adjustment unit in the working mode.

17. The power system control method according to claim 11, wherein the ripple phase difference is a ratio of 360 degrees to the quantity of power modules currently in the working mode.

18. The power system control method according to claim 10, wherein the power system further comprises M filter units, and the method further comprises:

receiving, by the filter unit, an alternating current voltage or a direct current voltage of a system input port, wherein each filter unit is connected to at least one of the N power modules in parallel or in series; or outputting, by the filter unit, an alternating current voltage or a direct current voltage to the target load, wherein each filter unit is connected to at least one of the N power modules in parallel or in series, wherein M is a positive integer less than or equal to N.

19. A power supply device, wherein the power supply device comprises the power system according to claim 1.

\* \* \* \* \*